(No Model.)

B. M. WILKERSON.
DENTAL CHAIR.

No. 581,670.   Patented Apr. 27, 1897.

Witnesses:
L. C. Hills.
J. B. Keefer

Inventor:
Basil M. Wilkerson,
by Marcellus Bailey
his Atty.

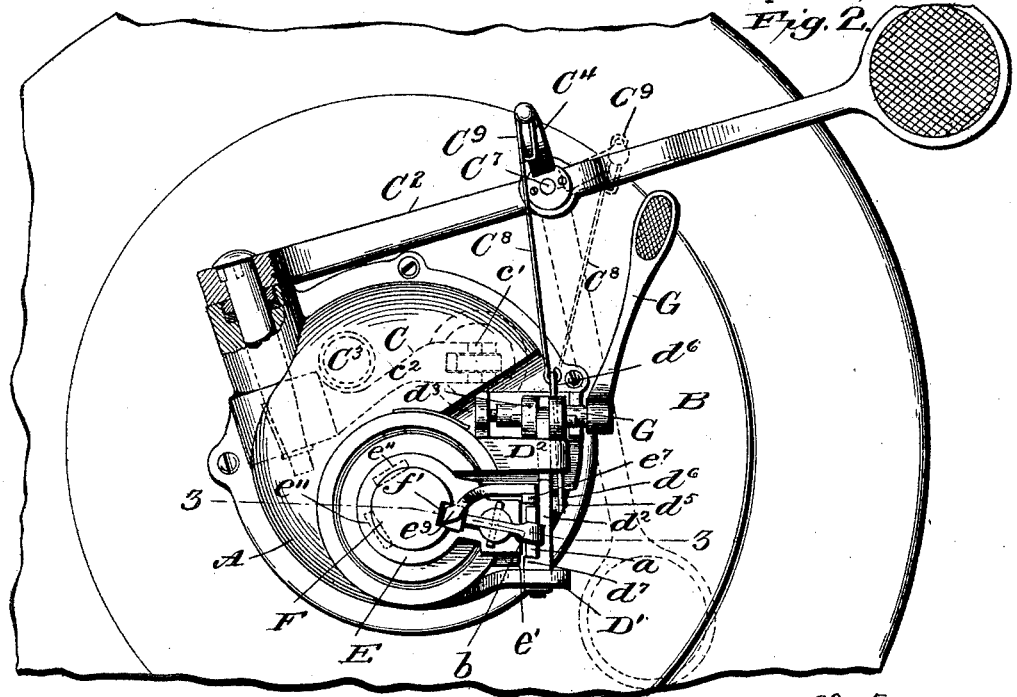
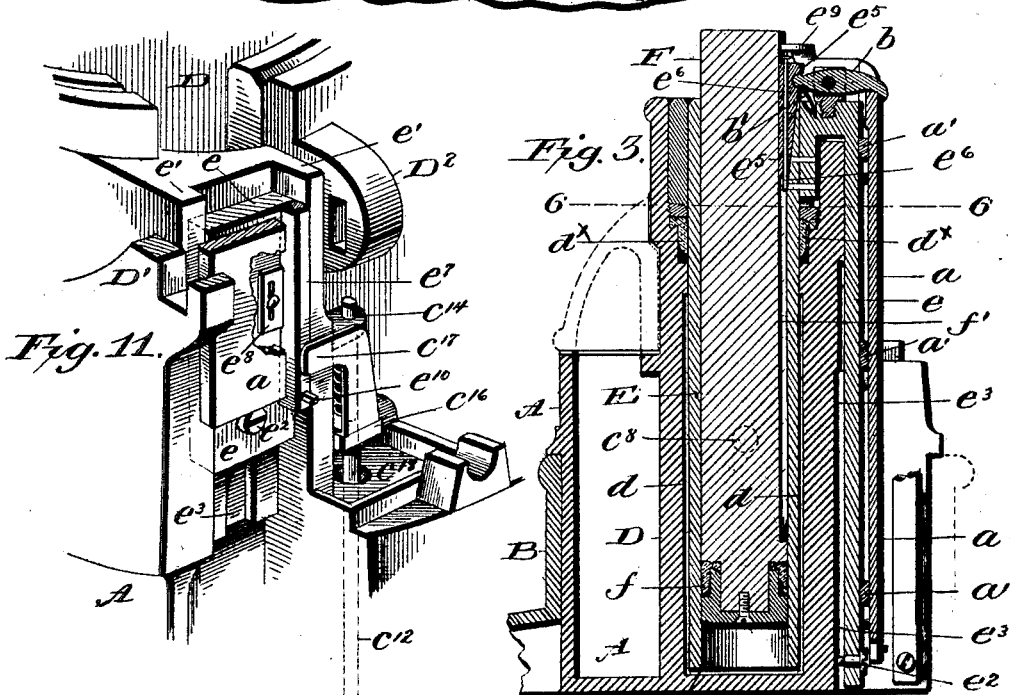

(No Model.) 9 Sheets—Sheet 3.
B. M. WILKERSON.
DENTAL CHAIR.
No. 581,670. Patented Apr. 27, 1897.
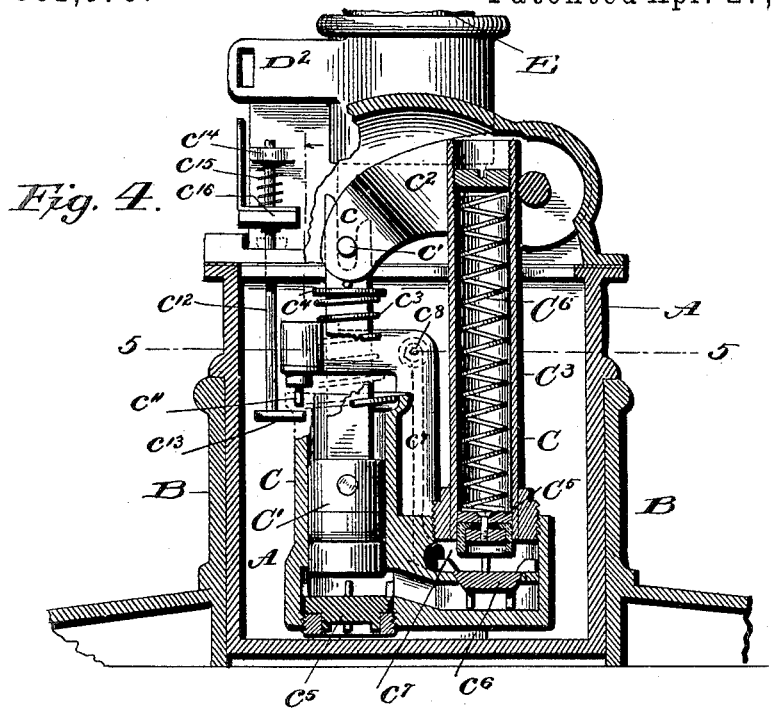
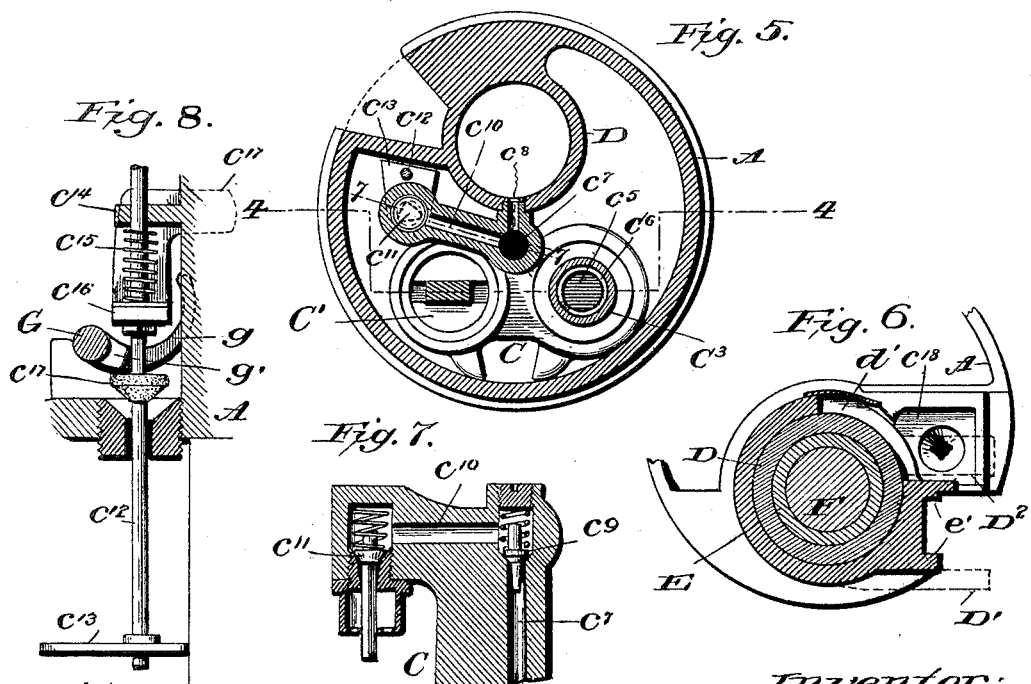
Witnesses
L. C. Hills
J. B. Keefer
Inventor
Basil M. Wilkerson,
by Marcellus Bailey
Atty.

(No Model.) 9 Sheets—Sheet 4.

B. M. WILKERSON.
DENTAL CHAIR.

No. 581,670. Patented Apr. 27, 1897.

Witnesses:
L. C. Hills.

Inventor:
Basil M. Wilkerson, (No Model.)  
9 Sheets—Sheet 5.
B. M. WILKERSON.
DENTAL CHAIR.
No. 581,670. Patented Apr. 27, 1897.
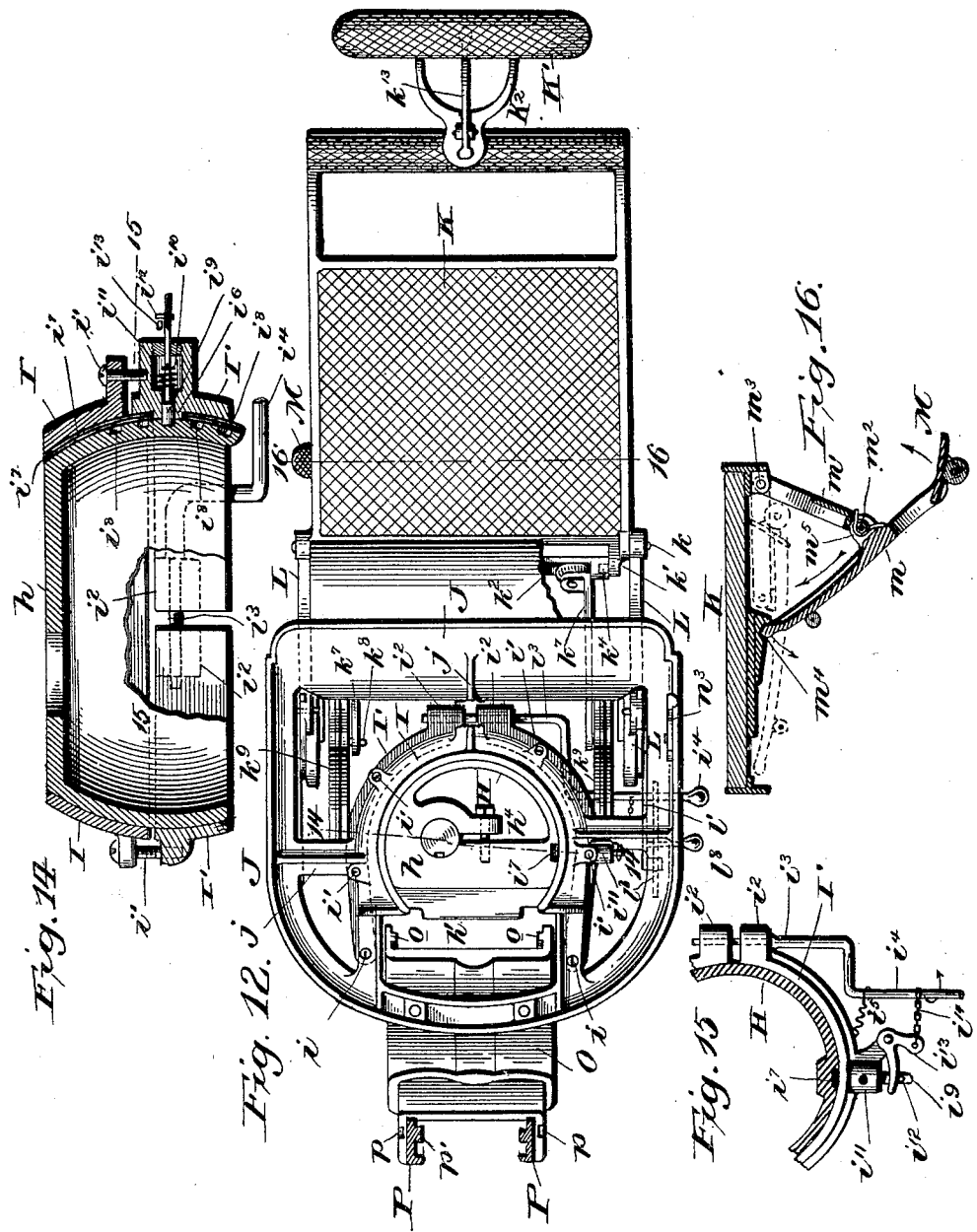
Witnesses:  
L. C. Hills.  
Inventor:  
Basil M. Wilkerson,  
by his Atty.

(No Model.) 9 Sheets—Sheet 6.
B. M. WILKERSON.
DENTAL CHAIR.
No. 581,670. Patented Apr. 27, 1897.
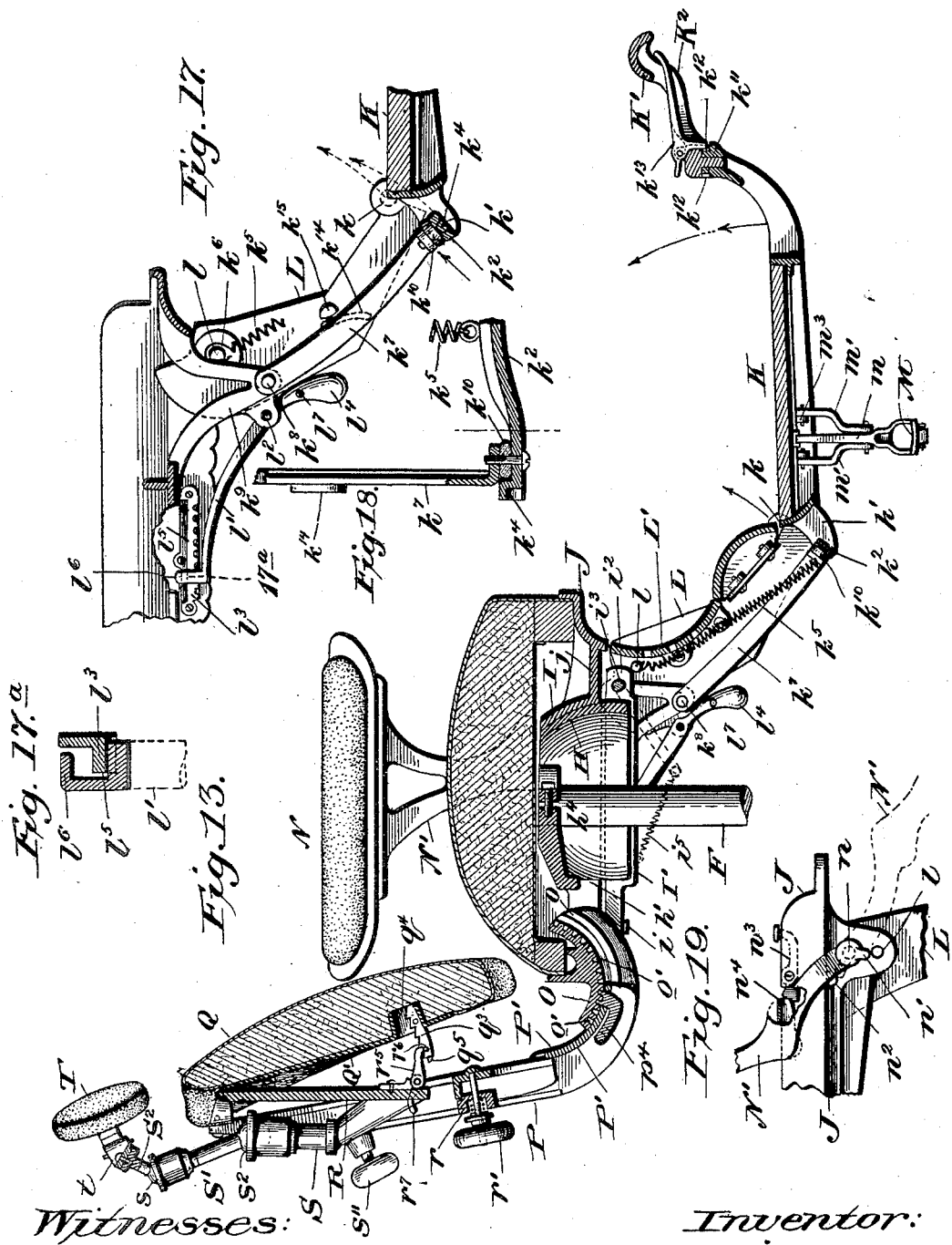
Witnesses:
L. C. Hills
F. B. Keefer
Inventor:
Basil M. Wilkerson,
by Marcellus Bailey
his Atty.

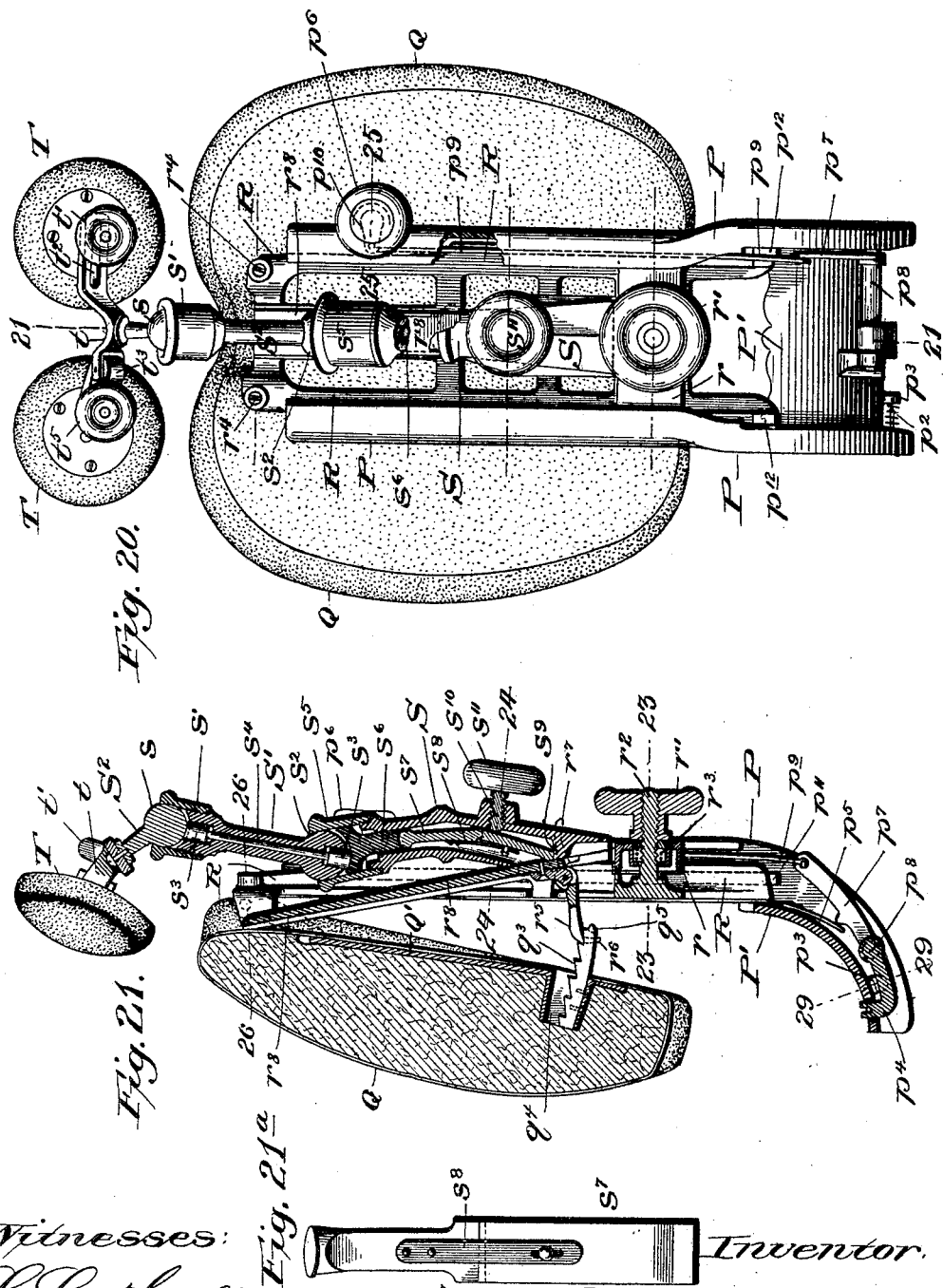

(No Model.) 9 Sheets—Sheet 8.
B. M. WILKERSON.
DENTAL CHAIR.
No. 581,670. Patented Apr. 27, 1897.
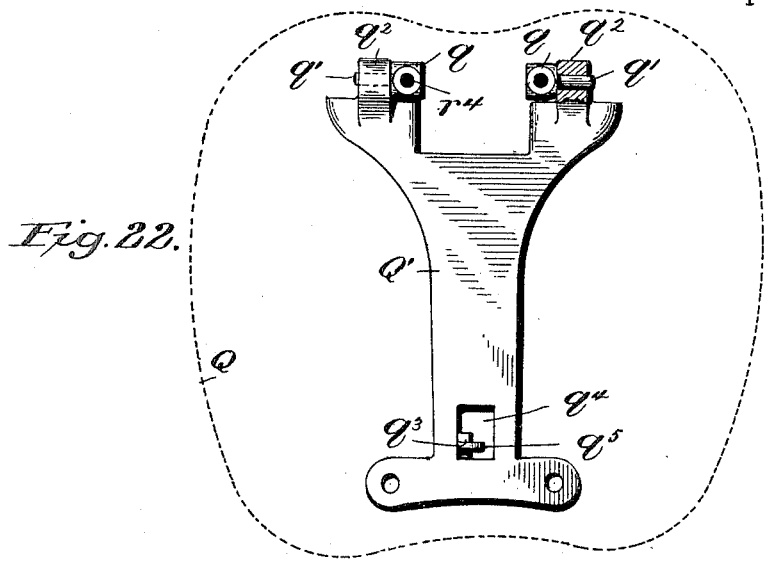
Fig. 22.
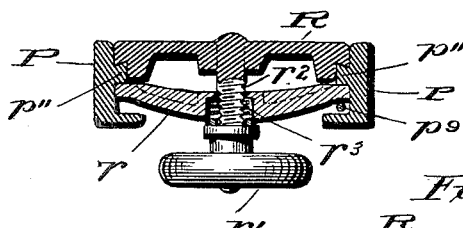
Fig. 23.
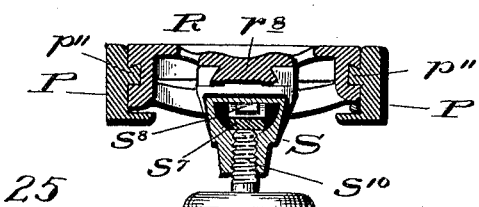
Fig. 24.
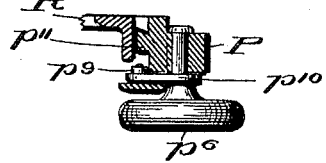
Fig. 25.
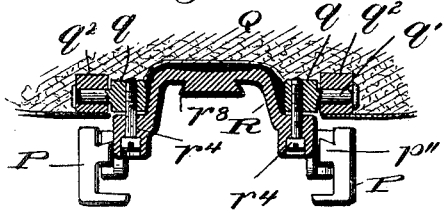
Fig. 26.
Fig. 27.
Witnesses:
L. C. Hills
Inventor:
Basil M. Wilkerson,
by his Atty.

(No Model.) B. M. WILKERSON. 9 Sheets—Sheet 9.
DENTAL CHAIR.
No. 581,670. Patented Apr. 27, 1897.
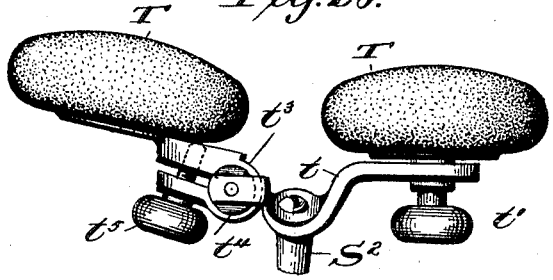
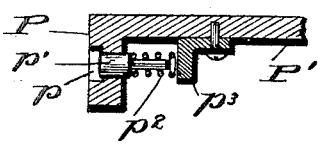
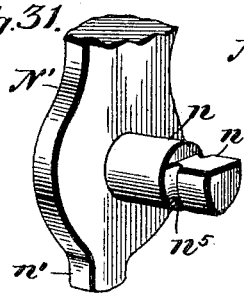
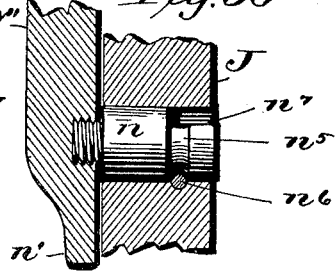
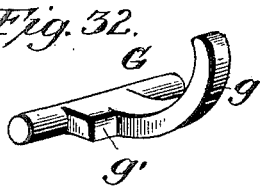
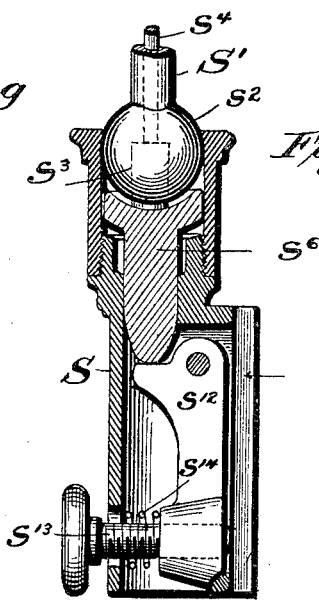
Witnesses:
L. C. Hills.
J. B. Keefe
Inventor:
Basil M. Wilkerson,
by Marcellus Bailey
his Atty.

UNITED STATES PATENT OFFICE.

BASIL M. WILKERSON, OF BALTIMORE, MARYLAND.

DENTAL CHAIR.

SPECIFICATION forming part of Letters Patent No. 581,670, dated April 27, 1897.

Application filed January 7, 1895. Serial No. 534,105. (No model.)

*To all whom it may concern:*

Be it known that I, BASIL M. WILKERSON, a citizen of the United States, and a resident of Baltimore, in the State of Maryland, have invented certain new and useful Improvements in Dental Chairs, of which the following is a specification.

My invention has relation to means for elevating, lowering, and adjusting the seat of the chair; to the means for adjusting the foot-board, the back, and the head-rest; to providing the foot-board with a folding step which automatically assumes its position of use when the foot-board occupies an elevated position, and to combining with the body of the chair an arm-rest detachable at will therefrom and also so joined thereto that it may be turned forward and down out of the way whenever desired.

The nature of my improvements and the manner in which they are or may be carried into practical effect can best be explained and understood by reference to the accompanying drawings, in which—

Figure 1:
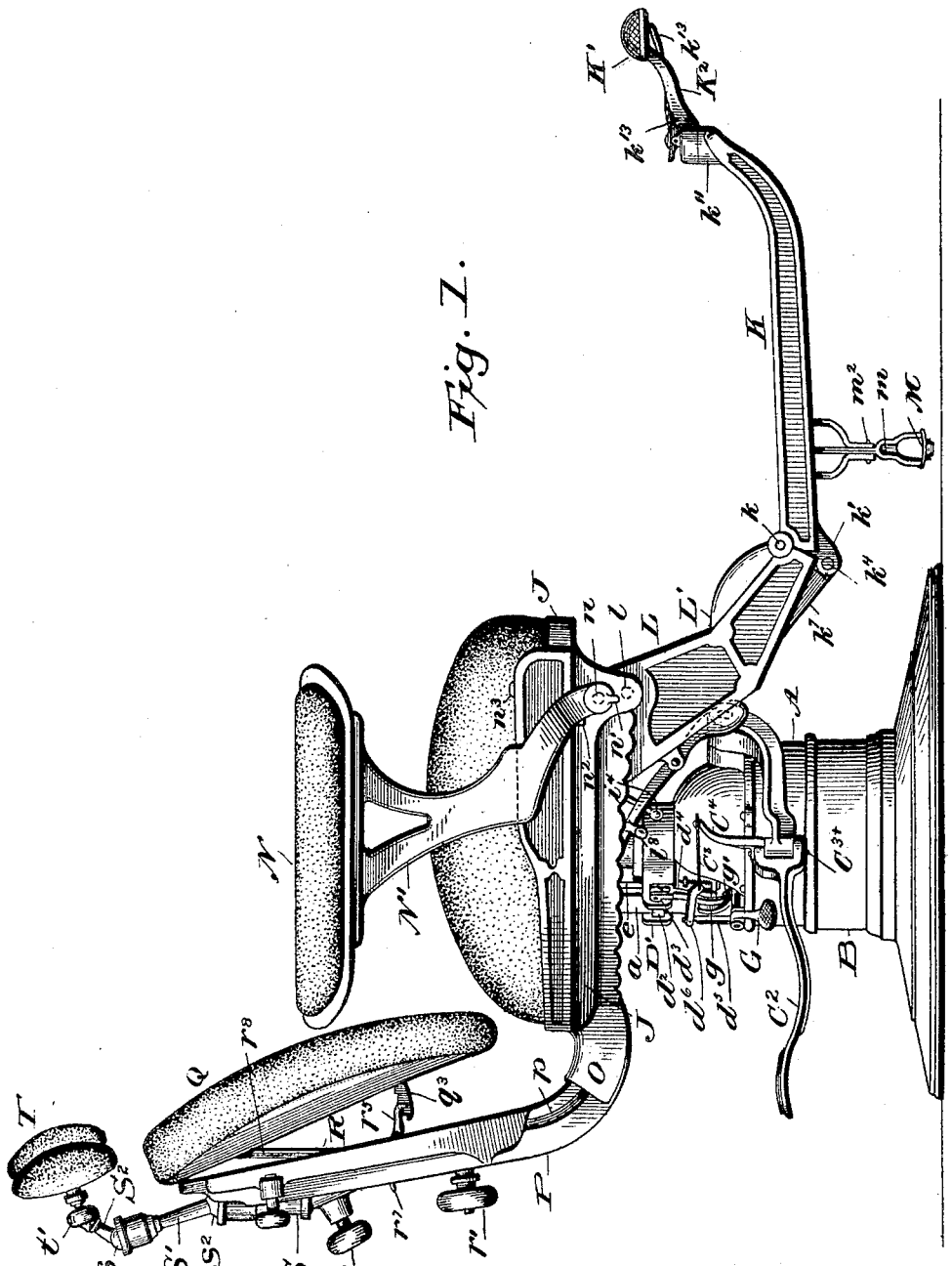
Figure 9:
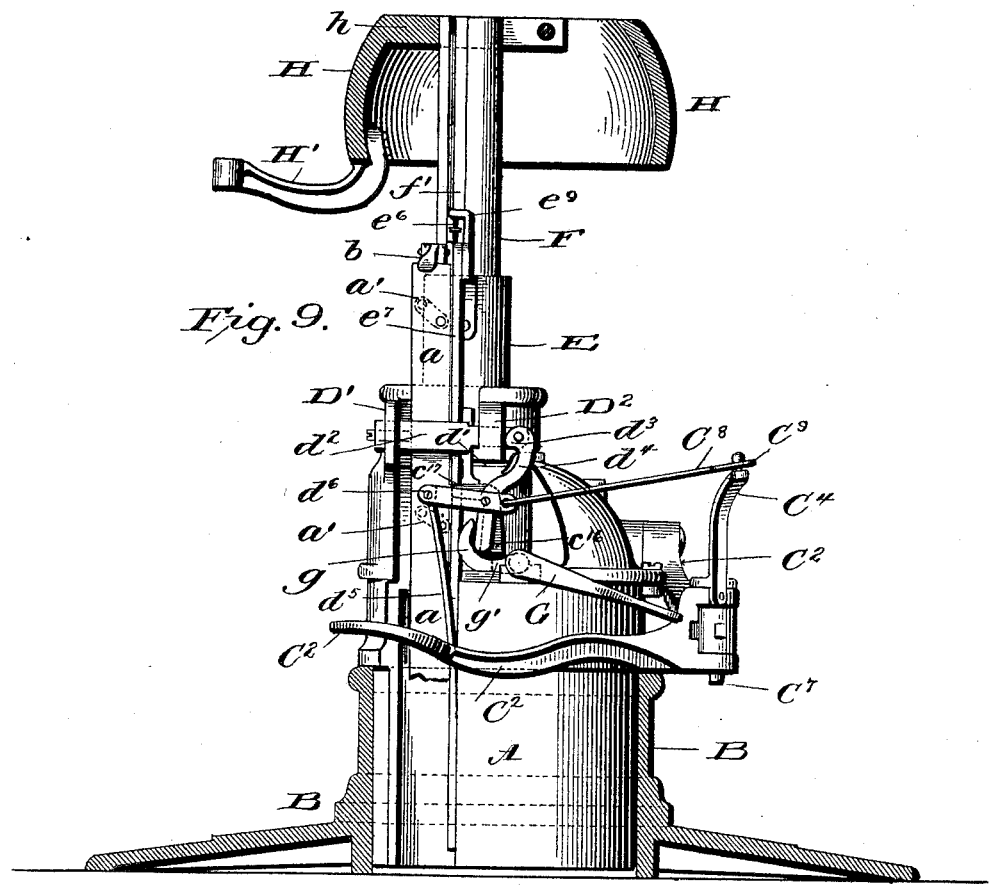
Figure 10:
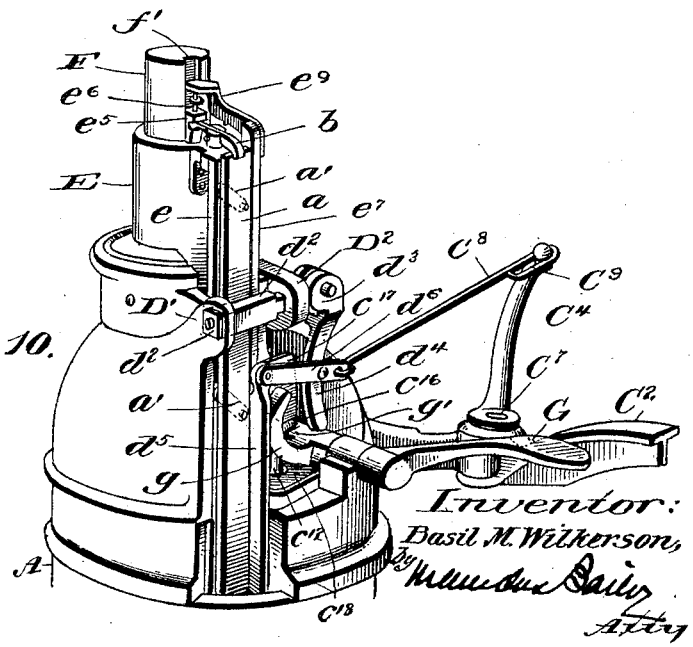

Figure 1 is a side elevation of a dental chair embodying my improvements in their preferred form. Fig. 2 is a plan, on enlarged scale, of the chair-base with the pivot of the elevating-lever in section. Fig. 3 is a section on line 3 3, Fig. 2. Fig. 4 is a section of the chair-base on line 4 4, Fig. 5. Fig. 5 is a section on line 5 5, Fig. 4. Fig. 6 is a section on line 6 6, Fig. 3. Fig. 7 is a detail section on line 7 7, Fig. 5, intended to illustrate the valve arrangement for regulating the flow of the liquid to and from the plunger-cylinder. Fig. 8 is a section illustrative of the device for opening the valve which permits the liquid to pass out from the plunger-cylinder when it is desired to allow the plunger to descend. Fig. 9 is a side elevation, partly in section, of the chair-base, designed more particularly to illustrate the plunger locking and releasing devices. In this figure I have shown in section the ball member of the ball-and-socket chair-supporting joint attached to the plunger and provided with a socketed bracket for carrying a spittoon and other appurtenances. Fig. 10 is a perspective view of the upper part of the base. Fig. 11 is a considerably-enlarged perspective view of a portion of the plunger locking and releasing devices. Fig. 12 is a plan of the chair with the seat and a portion of the back frame removed. Fig. 13 is a longitudinal vertical central section of the chair with the head-rest carrier in elevation. Fig. 14 is a section of the two members of the ball-and-socket joint on line 14 14 of Fig. 12. Fig. 15 is a partial section on line 15 15, Fig. 14. Fig. 16 is a section of the foot-board of the chair on line 16 16, Fig. 12, showing the folding step for use in getting into or out of the chair when the latter is in elevated position. Fig. 17 is a sectional view, on enlarged scale, of a portion of the foot-board, one of its hinged supporting-brackets, and the locking mechanism for holding the latter in adjusted position. Fig. 17ª is an enlarged cross-section on line 17ª, Fig. 17, of the upper end of the locking-pawl and of the rack-bar, which it engages. Fig. 18 is a horizontal section of part of the rear cross-bar of the foot-board frame and a sectional elevation of a portion of one of the adjusting-bars connected thereto. Fig. 19 is a sectional side elevation of part of one of the arm-rests and the portion of the chair-frame to which it is attached. Fig. 20 is a rear elevation of the chair-back. Fig. 21 is a vertical central section of the same on line 21 21, Fig. 20. Fig. 21ª is a view of the toggle-lever by which the different joints of the head-rest carrier are locked. Fig. 22 is an elevation of the back-pad frame. Fig. 23 is a section on line 23 23, Fig. 21. Fig. 24 is a section on line 24 24, Fig. 21. Fig. 25 is a section on line 25 25, Fig. 20, through the handle which controls the locking devices for the back-frame. Fig. 26 is a section on line 26 26, Fig. 21. Fig. 27 is an enlarged sectional plan of the device by which the back-pad is adjusted and held at different inclinations relatively to the back-frame. Fig. 28 is a top view of the head-rest. Fig. 29 is an enlarged section on line 29 29, Fig. 21, through one of the side bars of the back-frame, showing the spring-pressed friction-pad for preventing too-rapid drop of that frame when the latter is released. Fig. 30 is an enlarged section of the pivoted bayonet-joint between the arm-rest, Fig. 19, and its frame. Fig. 31 is a perspective view of the male member of the joint. Fig. 32 is an enlarged perspective view of the cam and finger shown in Figs. 9 and 10 for tripping the releasing-valve and plunger-clamping mechanism. Fig. 33 is a sectional view of a modification which will be hereinafter more particularly referred to.

*Chair-Elevating Mechanism.*

It is my object to impart immediate and continuous upward movement to the chair-body while applying the power which produces that movement intermittently and through the medium of a foot-lever-operated step-by-step movement.

A further object is to obtain a dental chair having an extensive vertical range of movement and capable of being rigidly locked at any point in said range. This portion of my improvements is illustrated in Figs. 1 to 11, inclusive, and in Fig. 32. The chair is one having a hydraulic lift comprising a plunger which supports the chair-body, a plunger-cylinder, a pump, and a reservoir from which the pump draws the liquid which is to be forced into the plunger-cylinder for the purpose of lifting the plunger, the pump being operated by a foot-lever, as customary.

A is the base, which constitutes also the liquid-reservoir, the liquid employed being usually oil. It sets and can rotate in the pedestal B and contains the pump C and its connections, as well as the plunger-cylinder D, in which is contained the chair-body-supporting plunger. A suitable lock can be provided to hold, when desired, the base from rotating in the pedestal. The rod of the pump-piston $C'$ has, as indicated in Fig. 4, a forked upper end $c$, which is entered by a pin $c'$ on an arm $c^2$, fast on the pivot of and vibrating with the foot-lever $C^2$, Fig. 1. The depression of the lever gives the downstroke to the piston—the stroke which forces the oil from the pump into the plunger-cylinder. The upstroke is occasioned by the spring $c^3$, surrounding the piston-rod and confined between the head of the pump-cylinder and a washer $c^4$ on the rod, which spring is compressed on the downstroke. The check-valve controlling the oil-inlet from the reservoir is shown at $c^5$ and the outlet check-valve for preventing backflow from the plunger-cylinder is shown at $c^6$, Fig. 4, this valve being interposed in the passage $c^7$, between the pump and the plunger cylinder, the liquid entering the latter cylinder at the point $c^8$, Figs. 3, 4, and 5, and passing down to the under side of the plunger through a clearance $d$, Fig. 3, provided for that purpose between the plunger and the cylinder D.

Under the arrangement thus far described the upward movement of the plunger would be intermittent and step by step, responding only to the down movement of the foot-lever. To make that intermittent movement immediately continuous, I provide a pressure-storage chamber $C^3$, which communicates with the passage $c^7$ on the side of the check-valve $c^6$ next to the plunger-cylinder. This chamber contains a piston-diaphragm or movable head $C^5$, which by the pressure of the oil forced in by the pump is forced up in that chamber and is influenced also by a strong spring $C^6$, (or its mechanical equivalent, such as a weight,) which tends to force the head in a direction opposite to that in which it is moved by the hydraulic pressure. I have thus in effect a pressure-storage chamber whose capacity is made variable by means of a movable bulkhead or partition influenced in one direction by the pump and in the other direction by a spring or its equivalent. It is to be observed also that the inlet $c^8$ to the plunger-cylinder is smaller in cross-sectional area than the passage $c^7$. Under this arrangement at each stroke of the pump the oil will not only be forced into the plunger-cylinder to lift the plunger, but the pressure-storage piston $C^5$ will be forced back into its chamber $C^3$, thus compressing the spring. Then after the stroke of the pump has been delivered the spring $C^6$ takes up the work instantly and by its recoil continues to force the oil into the plunger-cylinder while the pump-piston and its operating foot-lever are on the upstroke. In this way the upward movement of the plunger from the start is made continuous.

I am aware, of course, that pumps have been provided with air-chambers for the purpose of equalizing the flow; but such a device would be unfitted for the purposes which I have in view. The chair in such event would not respond immediately to the movement of the foot-lever; nor when once in movement would that movement be at once continuous. In the passage $c^7$, at a point near to the inlet to the plunger-cylinder, is still another check-valve $c^9$, Fig. 7, to prevent the weight carried by the plunger from affecting the piston $C^5$. The return-passage from the plunger-cylinder back into the oil-reservoir is shown at $c^{10}$, Fig. 7. It is controlled by a valve $c^{11}$, which when tripped or lifted permits the liquid from the plunger-cylinder to flow back into the oil-reservoir A. The device for the purpose consists of a vertically-movable rod $c^{12}$, Figs. 4 and 8, having at its lower end a toe or lateral projection $c^{13}$, that comes under the stem of the valve $c^{11}$. This rod at its upper end passes out through the top of the oil-chamber, is supported in a fixed guide-bracket $c^{14}$, and has a spring $c^{15}$, which normally holds it down in position where the valve $c^{11}$ will not be lifted. The spring $c^{15}$ for this purpose is confined between the fixed guide-bracket $c^{14}$ and a flange or shelf $c^{16}$, fast to the rod.

It will be remarked that the pump, the pressure-storage chamber, and all valves and connections are comprised in one organism, as shown clearly in Figs. 4 and 5, the connection of pipe $c^7$ to the plunger-cylinder inlet being made by means of a nipple which fits into the inlet-opening in that cylinder. These devices thus are removable in one piece or as a whole from the oil-reservoir for examination and possible repairs or cleaning which may be necessary. It is for this purpose that I make the joint $c$ $c'$ between the pump-piston and its operating-arm $c^2$ of such character that the two can readily be disengaged whenever desired, and the top or dome of the oil-reservoir for the same purpose is made so that it or so much of it as is over the pressure-storage chamber and pump and connections can be taken off to uncover said parts and permit them to be lifted out from the oil-reservoir. The nipple end of the passage $c^7$ can readily be disengaged from the inlet-opening $c^8$, in which it fits, by tilting a little the pump in a direction to withdraw the nipple from the opening. The pump-casting and its connections are held down tight in place when in the base or oil-reservoir in any suitable way—as, for example, by a cross-bar and pressure-screw used as like devices are employed to hold covers upon fruit-jars.

General reference only has thus far been made to the plunger, the improvements already described, as well as others hereinafter described, being applicable to various kinds of plungers or vertically-movable chair-supporting bars or stems; but the plunger shown in the drawings, both in itself and in its adjuncts, possesses peculiar characteristics which give it extensive range of movement and permit it to be rigidly locked at any point throughout that range.

The plunger itself is telescopic in structure, consisting in this instance of two members E F. The outer member E is tubular. Above the clearance $d$ it fits the plunger-cylinder closely, and the joint between the two is packed at $d^\times$. The inner member F fits and is movable up and down in the outer member E and has its lower end packed like a piston, as at $f$, and upon it is placed the chair-body.

The oil when first admitted to the plunger-cylinder raises both members as one until the outer tubular member reaches its upward limit and stops. Then the inner member (provided, of course, the pumping action is continued) alone rises, moving up in the now stationary tubular outer member until it, too, has reached its upward limit of motion or until the chair-body has been raised within that limit to the desired height. In this way I obtain a "high-low" chair in which all parts are contained in a base which may be wholly above the floor instead of having the plunger-cylinder extending partly below the floor, as heretofore usually has been the case, owing to the fact that the plunger has been made of a single continuous piece.

Various means for limiting the upward movement of each member obviously may be employed. What I prefer for the purpose so far as concerns the outer member E is to connect it at its upper end to a vertical bar $e$, which is held between and can move up and down between guide-flanges $e'$ in a seat upon the exterior of the base. From the inner face of the bar projects a stop-pin $e^2$, which enters a groove $e^3$ in the seat, and the bar can move up with the member E until the pin brings up against the closed upper end of the groove, which arrests further movement of the bar and consequently of the plunger member E.

The independent upward movement of the inner member F is limited in the following way: In this member is formed an external vertical groove $f'$, which affords clearance-way for a loose vertically-movable lifting-pin $e^6$, carried by the outer member E. For convenience sake it is mounted in the present instance in the locking-wedge $e^5$, which locks the two members together at any desired point, as hereinafter described, this wedge fitting the clearance-groove $f'$ in the inner member F. Upon the outer face and along one edge of the bar $e$ is mounted a rod $e^7$, so as to be capable of limited independent vertical movement thereon, it being connected for this purpose with the bar at suitable points by a pin-and-slot connection, as indicated at $e^8$. The rod at its upper end has a head $e^9$, which overhangs the lifting-pin $e^6$, and at its lower end it has a stud $e^{10}$, which is beneath an angular extension $c^{17}$ of the shelf or flange $c^{16}$ on the downwardly spring-pressed valve-lifting rod $c^{12}$. The stud $e^{10}$ is so positioned that when the outer plunger member E has reached its upward limit it (the stud) will be immediately under the angular extension $c^{17}$, as indicated in Fig. 11. If, now, with the outer member E at rest, the inner plunger member F continues its upward course, the movement will continue until the lower closed end of the groove $f'$ meets the lifting-pin $e^6$. When this takes place, then any further rise of the member F will raise the lifting-pin $e^6$, which in turn will lift rod $e^7$, with the effect of causing the latter through its stud $e^{10}$ to raise the valve-lifting rod $c^{12}$, thus opening the oil-discharge valve $c^{11}$ and permitting any further oil-supply from the pump to return directly to the oil-reservoir without entering the plunger-cylinder. Under these circumstances further upward movement of the inner plunger memmem F is of course impossible. The moment there is sufficient escape of oil to permit the plunger the downward movement (a very slight movement) requisite to lower the stud $e^{10}$, then the lifting-rod $c^{12}$ will be depressed by its spring and the discharge-valve $c^{11}$ will at once close and prevent further escape of oil.

I proceed now to a consideration of the means for locking the plunger in its adjusted position.

Each member of the telescopic plunger should be individually locked—that is to say, the inner member should be locked to the outer member and the outer member should be locked to its cylinder; and it is also desirable that these two locking devices should be so connected as to be operated by one and the same handle, lever, or other instrumentality.

The neck of the plunger-cylinder (this cylinder being, as shown, a casting made in one with the base) is formed as a split ring, as shown in plan in Fig. 2, having ears $D'$ $D^2$ and being divided for a portion of its periphery from the body of the casting by a horizontal slot or slit $d'$. By drawing together the two ends or ears $D'$ $D^2$ the ring-section formed by this slot or slit $d'$ can be compressed most tightly upon the outer plunger member E, which in this way is locked. The ear $D'$ is rigid and has no movement. The ear $D^2$ is upon and moves with the movable ring-section.

The drawing together of the ears, or, rather, the drawing of the ear $D^2$ toward the ear $D'$, is effected by a cross-bar $d^2$, which passes loosely through both ears and has pivoted on one end a cam or eccentric $d^3$, which bears against the outer face of the ear $D^2$. By the action of this cam and in accordance with the direction of its movement the ears will be drawn together or allowed to separate, as the case may be. The cam normally is held in position to lock the ring upon the plunger by a stout stiff spring $d^5$, connected to the tail or stem $d^4$ of the cam by a strap $d^6$. The parts are shown in normal position in Fig. 9.

It is desirable, as before said, that the locking of the two plunger members shall be occasioned by the movement of one and the same handle or lever. To this end I proceed as follows: Upon the outer face of the bar $e$ is mounted a second bar $a$, the two being connected by links $a'$, as indicated by dotted lines in Figs. 9 and 10, after the fashion of the two members of a parallel rule. Upon top of the bar $e$ is placed the pivoted lever $b$, having one of its ends jointed to the locking-wedge $e^5$, as seen in Fig. 3, and its other end overhanging the top of the bar $a$. Upward movement of the bar $a$ will, by lifting the tail of the lever, cause its other end to depress the wedge $e^5$ and jam it tight between the two members E F of the telescopic plunger, thus locking the two tightly together. A spring $b'$ normally holds the lever $b$ in a position where the wedge is lifted and the member F is unlocked. The upward movement of bar $a$ for locking purposes is effected by the cross-bar $d^2$. Under this arrangement the ear $D'$ is a mere guide, through which one end of the cross-bar passes and in which it can move freely lengthwise. This end of the bar has on it a lateral offset or shoulder $d^7$, Fig. 2, which abuts against the adjoining edge of the bar $a$. When, therefore, the pivoted cam $d^3$ is turned in locking direction, the first effect is to draw the shoulder $d^7$ of the cross-bar against the bar $a$, thus moving it to the right, swinging it up on the links $a'$, until it has (through lever $b$) depressed the wedge $e^5$ as far as it can. Then it furnishes a rigid abutment for the shoulder $d^7$, thus holding the end of the cross-bar while the locking-cam $d^3$, by its further movement, draws up the ear $D^2$ and causes the split ring to clamp the outer member E of the plunger. Thus by one and the same movement of the cam $d^3$ both members of the plunger are locked, the locking of the inner member taking place slightly in advance of that of the outer member. It will, of course, be understood that in its locking movement to the right the bar $a$ does not travel far enough to meet or interfere with the rod $e^7$.

If desired, gibs or flat pieces $e^{11}$ (shown in dotted lines in Fig. 2) can be set in the inner face of the outer tubular plunger member E at points on a level with that at which the wedge $e^5$ bears against the inner plunger member F, but on the side of the latter member opposite to the wedge. The plunger member F will, of course, be correspondingly shaped to fit against the flat faces of the gibs $e^{11}$. As the latter incline toward each other, forming approximately a V, the effect of forcing the locking-wedge $e^5$ home will be to jam the plunger member over into the V-recess formed by the gibs $e^{11}$, thus binding it tightly against rotation.

In order to lower the chair, I make use of the pivoted foot-lever G, Figs. 2, 9, 10, and 32. This lever, suitably journaled in the base, has upon its axle an arm $g$ for acting upon the tail of cam $d^3$ and a projection $g'$, which is designed to lift the valve-opening rod $c^{12}$, and for this purpose extends under the shelf or flange $c^{16}$, as indicated more plainly in Fig. 8, these two parts $g$ $g'$ being so arranged that the arm $g$ will operate to unlock the plunger before the projection $g'$ acts to open the valve. The lowering-lever G is depressed by the foot of the operator, and when that pressure is removed it is returned to normal position by the spring $d^5$.

Normally the plunger is locked, but when the chair is to be elevated it is then desirable that convenient means should be provided for unlocking the plunger and holding it unlocked during the continuance of the elevating operation. To this end I connect the plunger-locking mechanism to the elevating-lever $C^2$ in such manner that the act of adjusting the elevating-lever to its position of action shall cause the unlocking of the plunger and shall hold it unlocked so long as the elevating-lever maintains said position. The elevating-lever in this instance is made in two parts joined together upon a vertical pivot $C^7$, as shown clearly in Fig. 2, so that when the lever is not in use its outer portion can be folded up or swung in toward the chair-base and thus be out of the way of the operator. It is represented in this folded position in Fig. 9 and by dotted lines in Fig. 2. I avail myself of this construction to conveniently attain the end that I have in view. The outer section of the elevating-lever $C^2$ is provided with an arm $C^4$, which by a link $C^8$ is joined to the tail or stem $d^4$ of the cam $d^3$.

The arrangement is such that when the lever is unfolded and in position for use, as shown in Fig. 10 and in full lines in Fig. 2, the link $C^8$ will thereby be caused to turn the cam $d^3$ in a direction to release or unlock the plunger. Thus the plunger is automatically unlocked whenever and so long as the elevating-lever is adjusted to its position of use. It will be noted that whether the lever is in either folded or unfolded position the joint $C^7$ between the two sections of the elevating-lever is to one side of a straight line between the points at which the link is attached to the cam-tail $d^4$ and the arm $C^4$, respectively, the arrangement being such that whenever the outer lever-section is swung past the dead-center in either direction it will be drawn and held in the position toward which it may be moving at that time by the force of the spring $d^5$. The lever will thus be held folded or unfolded, as the case may be, by the stress of the spring $d^5$ and must be turned by the operator past the dead-center from either of those positions before it can by the action of the spring be drawn to and held in the other position.

It is further to be noted that the link $C^8$ is joined to the arm $C^4$ by an eye $C^9$, which permits the requisite lost motion to allow the link to move freely on the arm without disturbing the elevating-lever when the cam $d^3$ is operated by the lowering foot-lever G.

To complete the description of the base it only remains to say that at the point where the valve tripping or lifting rod $c^{12}$ passes out through the top of the oil-chamber the opening through which it passes (which may be used as the filling-orifice) can readily be closed by means of a cock or stopper $c^{17}$, Fig. 8, mounted and movable up and down on the rod. This is a considerable convenience in packing the chair for transportation. That portion of the base on which the orifice is located is formed as a pan $c^{18}$, Fig. 6, to catch any drip or leakage.

*Chair-Tilting Mechanism.*

I proceed now to a description of the manner of and means for mounting the chair-body upon the plunger, so that it may be tilted both lengthwise and laterally to any desired angle and there secured.

The joint between the chair-body and the plunger may be described in a general way as a ball-and-socket joint—the ball carried by the plunger and the socket carried by the chair-body.

The ball is shown more particularly in Fig. 9 at H. It is not a complete sphere, but merely a segment formed by cutting off the sphere horizontally at top and bottom, so as to leave an intermediate segment. This segment is hollow and its top is closed or partly closed by a head $h$, Fig. 12. The plunger, or, rather, the inner member F of the plunger, passes up through this hollow spherical segment and is secured at its upper end to the top or head $h$. This arrangement gives very much greater vertical range of movement to the chair-body than otherwise would be possible. As the ball is open on its under side, it will pass over and surround the neck or upper part of the base when the chair is lowered, thus allowing the latter to descend until the head $h$ brings up or very nearly brings up against the base. Moreover, the ball on its rear side is cut away, as indicated at $h'$, Fig. 12, this being to afford room for the movement of the adjoining mechanism for the chair-back to be presently described.

It may here be noted that the plunger is secured to the ball at a point which laterally is to one side of the vertical axis or center of the latter, as seen in Fig. 12. Thus the weight of the chair-body will be more to one side of the plunger and consequently the tendency will be to tilt the plunger toward that side with the effect of binding it in its bearings, thus further insuring a rigid lock for the plunger at all points throughout its vertical range of movement. This feature is applicable to any plunger, whether a telescopic plunger or a single-stem plunger.

The plunger is secured to the head $h$ of the ball in any suitable way—in this instance by a split-ring and clamping-screw device, (shown at $h^4$, Figs. 12 and 13.)

The socket which fits upon the hollow-ball segment is a socket divided horizontally into an upper section I and a lower section I'. The upper section is carried by and secured to the spider-like arms $j$ of the chair-seat-frame casting J, Fig. 12. This section in depth is less than half the ball, the parting-line between the two sections I I' being a short distance—say one-half inch or more or less—above the horizontal axis of the ball.

The lower section I' is divided vertically into two parts secured at the rear to the chair-seat frame at $i$, Fig. 12, and held to the upper section by bolts or screws $i'$, Figs. 12 and 14, passing into and through ears, with which both sections are provided at suitable intervals. This lower section I' forms in effect a split clamping-ring, its two free front ends having ears $i^2$, through which passes a suitable clamping screw or rod $i^3$, by rotating which the ears will be drawn together or allowed to spread apart according to the direction of rotation of the clamping device. The rotation of the clamp in the direction to close the ring upon the ball is effected by a crank-handle $i^4$, Figs. 1, 12, and 15, within convenient reach of the operator. It is when released automatically pulled in the other direction to clamp the socket upon the ball by means of a spring $i^5$, Fig. 15. A very slight movement of the handle $i^4$ serves to release the hold of the socket on the ball to allow the rocking or tilting of the chair on its joint.

To prevent horizontal rotation of the socket on the ball, the socket is provided with a stud $i^6$, Fig. 14—in this instance formed upon the inner face of the lower section I', which enters and permanently engages a vertical groove $i^7$ in the exterior of the ball. This stud is radial and on the prolongation of the horizontal axis of the ball crosswise of the chair, so that the chair-body can rock from front to rear without impediment, the stud occupying virtually the position of a pivot or journal, on which the rocking movement from front to rear takes place, which position it always maintains no matter what may be the extent to which the chair-body is tilted laterally.

Under the arrangement thus far described whenever the socket is free to move on the ball there is nothing to prevent the chair-body from rocking laterally as well as from front to rear. The lateral rocking movement is not so frequently availed of as that from front to rear, and it is often desirable to hold the chair against lateral rocking while permitting it to rock from front to rear. To this end I form in the bottom of the groove $i^7$ a vertical series of holes $i^8$, any one of which is adapted to be entered and engaged by a longitudinally-movable locking-pin $i^9$, that passes axially through the stud $i^6$ and is inwardly pressed by a spring $i^{10}$, held in a pocket $i^{11}$ upon the lower socket-section I'. The stem of this locking-pin passes out through the head of the pocket and is to be provided with a suitable handle or other means for drawing the pin out from engagement with the hole in which it may happen to be.

It is desirable for convenience sake that the locking-pin should be manipulated by the same instrumentality which operates the lower clamping socket-section I'. To this end, as shown in Fig. 15, I in the present instance provide the projecting outer end of the locking-pin stem with a projection or shoulder $i^{12}$, between which and the pocket $i^{11}$ extends one limb of an angle-lever $i^{13}$, pivoted at its elbow to a bracket bearing on the socket-section I' and having its other end connected by a chain $i^{14}$ or some equivalent instrumentality to the crank-handle $i^4$. The crank-handle $i^4$ will thus operate and control both locks or clamps for the socket; but, as hereinbefore stated, it is often desirable to operate the split-ring clamp which controls the rocking of the chair from front to rear without operating the lock which controls the lateral rocking. The connection $i^{14}$ between the crank-handle $i^4$ and the angle-lever $i^{13}$ is made sufficiently slack for the handle to move far enough to open the clamping-ring I' without affecting the angle-lever. Further movement of the crank-handle beyond this point will operate the angle-lever also and will leave the socket free to rock both laterally and from front to rear upon the ball. Suitable stops are of course to be provided for limiting the tilting range of movement of the chair-body, as will be understood by the skilled mechanic without further explanation.

To complete the description of this portion of the chair, it only remains to say that the ball can conveniently be provided with a bracket H', Fig. 9, for support of a spittoon or other attachment or appurtenance.

Foot-Board.

The main object I have in view in this portion of my improvements is to provide a foot-board capable of a vertical adjustment independently of the seat-frame and maintained at all times practically in parallelism with the seat, so that when raised to the level of the seat it will form, practically, an extension of the latter. My object in this is that the chair may be converted at will into what is tantamount to a couch. The adjustment is light and ready, owing to the fact that the foot-board is balanced or very nearly balanced by a spring. The foot-board is also cushioned for safety against sudden strain, as well as to prevent the movement of the feet of the patient upon the board from shaking the body of the chair, this shaking being frequently a source of annoyance to the operator in performing a delicate operation. The foot-board arrangement is represented more particularly in Figs. 1, 12, 13, 17, $17^a$, and 18.

The foot-board consists of the foot-board proper, K, and the foot-board frame.

The frame consists of two side arms or brackets L, each hinged at $l$ to the under side of the seat-frame, and a screen L' of any ornamental design, extending between said brackets. The frame can be swung up and down upon its hinge $l$ and is held in its adjusted position by any suitable locking device. The locking device (shown more clearly in Figs. 17 and $17^a$) consists in the present instance of a dog $l'$, pivoted at $l^2$ to the foot-board frame and adapted to take into one side of the notches in the under side of a rack-bar $l^3$, fast to the seat-frame, the dog being normally held in engagement with the bar by a weight $l^4$ or its equivalent.

I prefer to form the rack-bar with a horizontal laterally-projecting shelf $l^5$ and to provide the dog with a flange $l^6$, overhanging the shelf, there being enough clearance between the flange and shelf to allow the dog to be disengaged from the notch in the rack-bar before the flange meets the shelf. The object of this arrangement is to provide a stop against excessive movement of the dog. The flange slides freely and easily upon the shelf when the frame is being adjusted. There is one of these locking devices on each side of the chair, and the two dogs are rigidly connected by a cross rod or bar $l^7$, Fig. 17, so that they will move always in unison. A handle $l^8$, Figs. 1 and 12, within convenient reach of the operator is provided for the purpose of manipulating the dogs. The foot-board proper, K, is hinged to the foot-board frame at $k$. It is provided on each side at its rear end with a downwardly-projecting ear or lug $k'$, with a cross-bar $k^2$ extending between and pivoted or journaled at its ends in said ears, the pivotal point being indicated at $k^4$, Figs. 1 and 17. To this cross-bar at about its center is fastened the lower end of the spring $k^5$ for balancing the weight of the foot-board structure. The upper end of this spring is made fast to a rod $k^6$ in line with the axis of movement $l$ of the foot-board frame.

On each side of the chair there is made fast to the cross-bar $k^4$ a controlling-rod $k^7$, the upper end of which is pivoted at $k^8$ to a bracket $k^9$, secured to the seat-frame J. It is through this instrumentality that the parallelism of the foot-board K with the chair-seat is preserved. When the foot-board frame is swung up on its hinge $l$, it will be seen that the rods $k^7$ will pull upon the ears $k'$ in a direction to slightly turn the foot-board down, so as to compensate for the upward tilt which otherwise would be given to the board.

The foot-board can be raised to the level of the chair-seat, preserving practically its parallelism therewith. In this position the foot-board frame will intervene to a slight extent between the chair-seat and the foot-board proper, but this will be a matter of no moment. The body of the patient will rest upon and be supported by the chair-seat, (and the chair-back as well, which latter can also be turned back so as to be on a level with the chair-seat, if desired,) and the foot-board will support the legs of the patient without discomfort.

In order to cushion the foot-board for the purposes hereinbefore mentioned, I interpose between the ends of the controlling-rods $k^7$ and the points on the cross-bar $k^4$ to which the same are attached pads or cushions $k^{10}$, of elastic material, such as vulcanized rubber, Fig. 18, these pads being capable of yielding to any sudden strain or jar upon the foot-board proper, so as to prevent the movement due to this cause from being appreciably transmitted to the chair-body.

With a view to permit the foot-board to be folded up against the body of the chair in compact form for transportation the joint $k^4$ between the cross-bar $k^2$ and the ears $k'$ is made by forming the cross-bar at its ends with half-round bearings, as in Figs. 17 and 18, which rest upon pins or journals projecting inwardly from the interior opposite faces of the ears $k'$. Under this arrangement the foot-board can, by hand, be moved to disengage the journal-pins from the half-round bearings in the cross-bar, and can then be folded up independently of the cross-bar. To prevent the cross-bar $k^2$ when thus released from being pulled up by the spring $k^5$, I form upon the interior opposite faces of the controlling-rods $k^7$ and the side arms or brackets L stops $k^{14}$ $k^{15}$, Fig. 17, which engage each other and arrest any upward movement at this time of the rods $k^7$ and the cross-bar $k^2$ which they carry. These stops are so shaped and proportioned that their meeting faces will slide upon and move by one another as the parts $k^7$ and L vary their positions relatively to each other during the adjustment of the foot-board, and they also hold the cross-bar $k^2$ always in such position that when the foot-board is turned down again from its folded position the journal-pins on the ears $k'$ will enter their half-round bearings on the under side of the cross-bar.

At the front of the foot-board is a foot-rest K', carried by a support $K^2$, which is essentially a crank-arm swiveled upon a vertical axis in a socket $k^{11}$ in the foot-board. The object of this arrangement is that the foot-rest may be brought nearer to or farther from the chair-seat, as the convenience of the patient may require. On the front and rear of the socket $k^{11}$ are diametrically opposite notches $k^{12}$, one or the other of which will be engaged by the pivoted detent-lever $k^{13}$. This lever is weighted or spring-pressed, so as to automatically engage the notch opposite which it may be brought; and its handle end is conveniently placed so that it may be reached and manipulated by the operator at the time he takes hold of the foot-rest for the purpose of reversing its position, or it may, indeed, be operated by the patient, using merely the foot for that purpose. I am aware that a reversible foot-rest is not new, broadly considered, but I believe the arrangement for that purpose just described to be new with me.

*Auxiliary Step.*

In high-low chairs an auxiliary step by means of which when the chair-body is raised the patient can get up into the chair is an important adjunct; but any such step which comes between the foot-board and the floor on which the chair stands will necessarily limit the extent to which the chair can be lowered unless it be so arranged that it can fold up when occasion requires, so as to allow the chair to be lowered even to the point where the foot-board is practically in contact with the floor, as at times is necessary. With this in view I have combined with the foot-board what I term an "automatically-adjustable step," which, when the chair is raised, will be automatically unfolded or projected into position for use, as well as braced in that position, and which, on the other hand, when the chair-body in its descent reaches a position where the step brings up against the floor, will, when the chair descends farther, automatically fold up, so as to permit that descent to be unimpeded. The manner in which I attain this result will be understood by reference to Figs. 1, 12, and 16, the figure last named being a section on line 16 16 of Fig. 12.

The step proper, M, which is below the foot-board K, is intended to project laterally beyond the latter, as indicated in Fig. 12. It is held between the forked outer end of a supporting-arm $m$, connected to the under side of the foot-board by straps $m'$. The arm is hung between and pivoted at about its middle to the lower ends of these straps, as shown at $m^2$, Figs. 1 and 16, and the straps at their upper ends are hinged at $m^3$ to the under side of the foot-boord near one of its edges. The arm $m$ back of its pivot is extended to form a brace, the upper end of which is adapted to take into a notch $m^4$ in an abutment on the under side of the foot-board. In this position it will be seen that the step is thoroughly braced to sustain the weight of the person stepping upon it. It is brought to this position by the action of a spring $m^5$, coiled upon the pivot $m^2$ and bearing outwardly at its ends against the straps $m'$. This spring is put under compression when the step is folded up and by its stress tends to cause the step to resume its unfolded position. (Shown in Fig. 16.)

Under the arrangement shown when the chair has descended far enough for the step to reach and bear against the floor then further descent of the chair-body will cause the step to fold up toward the straps $m'$, the latter swinging inward at the same time until when the chair-body has descended far enough the step as a whole will be folded up flat against the bottom of the foot-board, as indicated by dotted lines in Fig. 16. On the step-supporting arm $m$ I mount idlers or friction-rollers which will ease the folding movement of the step and prevent the friction and drag between the arm $m$ and the floor-surface which otherwise would take place. The moment the chair is raised far enough the step will resume its unfolded position. (Shown in full lines in Fig. 16.)

I remark here that the spring may be dispensed with and the frame can be so weighted or made so heavy as to automatically unfold by gravity when permitted to do so, and I desire to be understood as including any such obvious modification or substitution in my claims.

Arm-Rest.

My invention in this direction contemplates combining with the chair an arm-rest which at the lower end of its support is pivoted to the seat-frame in such manner that when desired the arm-rest can be turned upon its pivot forward and down alongside of the foot-board, a suitable lock being provided for holding it rigid when in its normal position. The object is to provide an arm-rest which when occasion demands may be brought to a position in which it is entirely out of the way of the operator. This portion of my invention is illustrated in Figs. 1, 12, 19, 30, and 31.

The arm-rest is shown at N and its support at N'. The support at its lower end is pivoted at $n$ to the seat-frame, at or near the forward end of the latter, on a horizontal axis, which will permit it to be swung forward and down, as indicated by dotted lines in Fig. 19. In this position it is alongside of the operator and entirely out of his way. A stop $n'$ on the support is provided to limit the extent to which the arm can be turned down. This stop, when the proper limit is reached, meets a shoulder or abutment $n^2$ on the seat-frame and prevents further movement in that direction.

The arm-rest when raised and in normal position can be rigidly locked in that position by any suitable means—in this instance by a cam-lever $n^3$, Figs. 12 and 19, pivoted to the seat-frame, having a cam end to bear against a proper abutment $n^4$ on the arm-rest support N' and a handle end by which it is operated.

By depressing the handle end the cam end of the lever will be jammed and wedged against the abutment $n^4$, thus rigidly locking the arm-rest in position. By lifting the handle end of the lever the arm-rest will be released.

The hinge or pivot point $n$ of the support N' is at a point considerably below the seat and at or near the front end of the seat-frame, thus allowing the arm-rest to swing forward and down, so as to practically be clear of the side of the chair. When the arm-rest is raised into position, its support N' rests by gravity upon the rail on the side of the seat-frame where the cam-lever $n^3$ is located, and this lever engages the support at a point above the hinge $n$ and between the latter and the arm cushion or rest proper, N. Thus the arm-rest, when raised into position, always stops in the right place and can be most firmly locked in that position.

It may be desirable at times to entirely remove the arm-rest from the chair. A convenient arrangement to permit this is illustrated in Figs. 30 and 31. The cylindrical pivot-stud $n$, attached to the arm-rest support N', enters a suitable socket or bearing formed for it in the seat-frame J and is peripherally grooved at $n^5$ to receive a cross-pin $n^6$, which holds it in its bearing without impeding its free rotation therein. The stud on one side is cut away back of this groove, as shown at $n^7$, so that when it is turned far enough to bring this cut-away portion opposite the pin $n^6$ the latter will no longer engage the stud, and the latter can then be withdrawn from its socket in the seat-frame. The parts are shown in Fig. 30 in the position which they occupy when the arm-rest is raised and in normal position. When the arm-rest is swung forward and down, as in dotted lines in Fig. 19, the cut-away part $n^7$ of the pivot-stud $n$ will be brought opposite to the cross-pin $n^6$, and the arm-rest is then free to be removed from the chair.

The Back.

The back of a dental chair generally consists of a back-supporting frame hinged to the seat-frame so as to be inclined from front to rear relatively to the seat, in combination with a back proper carried by and vertically adjustable upon the back-supporting frame. Usually the back-supporting frame is hinged to the seat-frame by pivots held in suitable bracket-supports. These pivots and their supports unduly limit the range of vertical movement of the back proper, preventing the latter from being lowered as far as it otherwise might be, and are also in the way of the operator. To obviate these objections, I unite the back-supporting frame to the seat-frame by arc-shaped concentric hinge-pieces, the one moving in or upon the other and a lock being provided to hold the parts in their adjusted position. I have also improved the construction and arrangement of the parts which compose the back proper. This portion of my improvements is illustrated in Figs. 1, 12, 13, 20 to 27, inclusive, and 29.

The arc-shaped hinge member which is carried by the seat-frame is shown at O, Figs. 1, 12, and 13. It has the shape of an inverted trough and is fastened concave side uppermost to the rear of the seat-frame, below the top of the same, with its inner end projecting up under the seat-frame, as seen in Fig. 13. On each of its interior opposite side walls it has a tongue $o$, curved longitudinally in the arc of a circle, to engage a corresponding groove in the back-supporting frame, and it is further provided with a rack or series of teeth $o'$ in the under face of its top to receive and engage a locking-dog carried by the back-supporting frame.

The back-supporting frame consists of two guide-rails P, straight for the greater portion of their length, but at their lower ends curved in the arc of a circle corresponding to that of the arc-shaped hinge member O, these curved lower ends being connected on the side or face next to the seat-frame by a web P', which runs under the correspondingly-curved top of the hinge member O. In the exterior opposite faces of the curved ends of the rails P are curved grooves $p$, into which the tongues $o$ are received when the two concentric hinge members are fitted together. Under this arrangement the hinge is entirely out of the way of the operator, and as it is below the seat it allows the back to descend until, if need be, the lower end of the back-pad will come between the seat and the back-supporting frame.

As the hinge members are placed concave side uppermost, the tendency when the back is inclined rearwardly is to close any interval between the back-pad and the seat. Moreover, the extended contact between the two hinge members produces friction, which tends to prevent sudden drop of the back-supporting frame when the latter is unlocked. To increase this frictional resistance, I provide the back-supporting frame with a friction-pad $p'$, Figs. 20, 21, and 29, which projects through one of the grooves $p$ in position to bear upon the tongue $o$ of the hinge member O and for this purpose is outwardly spring-pressed by a coil-spring $p^2$, surrounding the stem of the pad and confined between the head of the latter and an abutment $p^3$ on the web P' of the back-supporting frame.

The locking together of the hinge members is effected by the toothed dog $p^4$, pivoted to the under side of the web P', with its toothed end projecting through an aperture in the web in position to engage the rack $o'$, as seen in Figs. 21 and 13, the toothed end of the dog being outwardly pressed for this purpose by a spring $p^5$. For the purpose of unlocking the dog I provide a handle $p^6$, mounted upon the upper part of the chair-supporting frame, my object in thus locating the handle being to permit the operator to use the same handle by which he unlocks the back-supporting frame to uphold that frame also. The handle $p^6$ thus located can be connected to the locking-dog by various devices which will suggest themselves to the skilled mechanic. The mechanism which I now prefer for this purpose and which is shown in Figs. 20, 21, and 25 consists of an arm $p^7$, fixed to the axle $p^8$, to which the dog also is fixed, and a connecting-rod $p^9$, jointed at its lower end to the arm $p^7$ and at its upper end to a crank $p^{10}$ on the stem or arbor of handle $p^6$. The connecting-rod is housed in one of the rails P, which is suitably formed for this purpose.

I am aware that a hinge consisting of two concentric arc-shaped members fitted together and adapted to slide the one on or in the other is not new and has been used for various purposes; but I am not aware that such a hinge has ever before been applied and used in the manner hereinbefore described to connect a seat-frame and a back-supporting frame whether provided or not with a back vertically adjustable thereon. The location of the unlocking-handle on a position on the back-supporting frame to permit the operator to use the same handle at once for unlocking the frame and supporting it at the same time I also believe to be new with me.

I proceed now to a description of the vertically-adjustable back. This back consists of a back-pad Q and a carrier R therefor. The carrier R is a skeleton frame which fits between the rails P of the back-supporting frame and is held in ways therein in which it can move up and down. I prefer to form on the interior opposite faces of the rails longitudinal tongues $p^{11}$, Figs. 12 and 24, which enter and engage corresponding grooves in the exterior opposite edges of the carrier R. I prefer that these tongues and grooves should have a dovetail formation, as indicated in the figures referred to, so that the carrier may serve to hold together the upper unconnected ends of the rails P and prevent any tendency on their part to spread apart, the undercut forming the dovetail being preferably on one side only of the tongue and that side the front side or the side next to the back-pad. The back-pad carrier R can move freely up and down between the rails P, the extent of its downward movement being limited by stops $p^{12}$, Fig. 20, against which brings up the cross-bar $r$ on the carrier R. This cross-bar I utilize as a clamp to fasten the carrier R in its adjusted position. The cross-bar, as shown in Fig. 23, is a loose bar, and at the point where it is located the carrier is cut away so as to expose the sides of the tongues $p^{11}$ adjoining the bar. Thus the tongues $p^{11}$ at this point are embraced between the carrier on one side and the clamp-bar $r$ on the other.

The clamp-bar is controlled by a knob or handle $r'$, which screws upon a screw $r^2$, passing loosely through the clamp $r$, and is fixed rigidly to the carrier, as shown in Fig. 23. By screwing the handle down upon the cross-bar the latter will be forced up against the tongues $p^{11}$, and the latter will thus be tightly bound and clamped between the cross-bar clamp on one side and the body of the carrier R on the other. With a view to still exert upon the carrier R, even when the latter is released, a frictional contact of the clamp $r$, which will prevent sudden drop of the carrier, I provide a spring $r^3$, held in a socket in the clamp and confined between the latter and the inner end of the handle $r'$. This spring, which is strongly compressed when the handle is screwed home, tends when the handle is turned in a direction to release the carrier to cause the clamp to still exert pressure sufficient to prevent too free movement of the carrier R.

The back-pad Q is hinged at its upper end upon a horizontal axis to its carrier R, so that it may be tilted or inclined from front to rear upon that hinge as an axis. The hinging of the two together is effected in this instance by blocks $q$, having pivot-pins $q'$, mounted in bearings or bosses $q^2$ in the back-pad frame $Q'$, as illustrated more particularly in Figs. 22 and 26, the blocks $q$ being fastened to the carrier R by screws $r^4$, Figs. 20 and 26. Thus while all parts of the hinge-joint are covered by the upholstery of the back-pad, yet the pad can at any time be readily removed simply by taking out the screws $r^4$.

The frame $Q'$ is a suitable skeleton frame of some appropriate material upon which as a foundation the pad is upholstered. The pad Q is held in its adjusted position relatively to the carrier by a pivoted latch or detent $r^5$ on the carrier, Figs. 21 and 27, which engages a rack or notched bar $q^3$, the inner end of which is made fast to and contained in a pocket $q^4$ in the back or rear face of the pad, this pocket being for reception of the dog when the pad is folded up against the carrier. To prevent the back-pad from being swung out far enough to disengage its rack $q^3$ from the detent $r^5$, the rack has on its outer end a laterally-projecting stop $q^5$, which is in the path of a finger $r^6$ on the detent, Figs. 13, 21, and 27. When the back-pad has been swung out away from its carrier a certain distance, the finger $r^6$ will bring up against the stop $q^5$, thus preventing further movement of the back-pad in that direction. The detent $r^5$ drops by gravity into engagement with the rack, but a spring may be used to insure the engaging action, if desired. By a handle $r^7$, Fig. 27, with which the detent is provided, the latter can be lifted by hand so as to be disengaged from the rack $q^3$.

The Head-Rest.

The head-rest mechanism which I am about to describe is vertically adjustable and capable also of permitting the head-rest pad all the movements of the human head and all of its various joints simultaneously locked or unlocked, as the case may be, by the operation of a single handle. It is illustrated more particularly in Figs. 1, 13, 20, 21, 21$^a$, 24, 26, and 28.

The head-rest carrier is a jointed stem composed of three sections $S$ $S'$ $S^2$, united together by universal joints. The lowermost section S, which is tubular or hollow, is mounted and adapted to slide up and down on a dovetailed way $r^8$, Figs. 20, 21, 24, and 26, provided for it on the back-pad carrier R, the section S, as indicated in Fig. 24, being formed with a base grooved to fit upon and embrace the dovetailed way $r^8$. It will be noted that this way is inclined from front to rear with respect to the back-supporting frame P, in which the carrier R moves, its inclination being to the front at its upper end. The inclination is such in fact as to cause the upper portion of the way $r^8$ to be received, as it were, within the compass of the back-pad Q, the upper portion of the rear face of which, except at the point where it is intended to accommodate the way $r^8$, being in rear of the way when the back-pad is folded up against the carrier R and its hinge being the rear of the way $r^8$. The object of this formation is to give a greater range of forward movement to the head-rest stem, in order to bring the head-rest pad farther to the front than otherwise would be practicable.

To the uppermost section $S^2$ is attached the head-rest proper, T. The intermediate section $S'$ is connected to its two fellow sections by ball-and-socket joints. The uppermost section $S^2$ is solid and has a ball $s$ on its lower end. The middle section $S'$ has a ball $s^2$ on its lower end and at its upper end has a socket to receive the ball $s$ of section $S^2$. This socket is formed by the concave upper end of section $S'$, in conjunction with a sleeve $s'$, which screws upon the section and has a concave interior shaped to fit upon the ball $s$. In both the ball-and-socket ends of the intermediate section $S'$ are formed pockets to receive pressers $s^3$, and the section between these sockets is longitudinally bored to receive a spindle $s^4$, which extends between and contacts at its ends with the pressers $s^3$. These pressers project a little beyond their pockets into the sockets to which they respectively pertain.

The ball $s^2$ on the lower end of the middle section S' is held in a socket formed by the sleeve $s^5$ screwing upon the upper end of the lowermost section S, in conjunction with the concave upper end of the push-piece $s^6$, mounted and longitudinally movable in section S. Under this arrangement when the push-piece $s^6$ is forced up it will jam the ball $s^2$ of the middle section S' tight in its socket and at the same time will, through the lower presser $s^3$ and spindle $s^4$, cause the upper presser $s^3$ in a similar manner to jam the ball $s$ of the top section $S^2$ tight in its socket. Thus by upward movement of the push-piece $s^6$ both joints of the head-rest stem will be locked rigidly, and, correspondingly, when the push-piece $s^6$ is allowed to drop both joints will simultaneously be unlocked. Manifestly various means can be employed to thus actuate the push-piece. The device which I now prefer for the purpose consists of the toggle-lever $s^7$, provided with a spring $s^8$, by which the toggle is kept normally bent. This toggle-lever is placed in the section S in the position shown in Fig. 21, with its ends bearing at the top against the push-piece $s^6$ and at the bottom against an abutment $s^9$ on the interior of the section. A pressure-screw $s^{10}$, provided with an external operating handle or knob $s^{11}$, enters the section through a suitable screw-threaded socket in a position where its inner end will bear against the toggle-lever. By screwing in the pressure-screw it will straighten the lever, with the effect of forcing up the push-piece $s^6$ and thus locking both joints. When the toggle-lever is relieved from the pressure of the screw, it will resume its normal bent condition and the joints will unlock by gravity.

While other means may be employed to lock the head-rest stem against vertical movement upon the way $r^8$, yet it is very much to be preferred that this locking action should be effected by the same instrumentality which locks the joints between the sections of the stem. This result is attained by the mechanism just described. The toggle-lever at its lower end is seated in the angle at the junction or meeting-point of the abutment $s^9$ and the face of the way $r^8$ and bears against both. When therefore the toggle-lever is straightened by the action of the pressure-screw, its lower end will be jammed not only against the abutment, but also with equal force upon the face of the way, and the section S in this way will be rigidly clamped or locked to the way $r^8$ by the same movement of the same instrumentality which locks the joints between the sections of the head-rest stem. This feature I believe to be new with me beyond its particular embodiment represented in the drawings and just described.

Manifestly other means besides the toggle-lever can be employed. I might use, for example, the arrangement illustrated in Fig. 33, in which the instrumentality which operates upon the push-piece $s^6$ is a lever $s^{12}$, pivoted in the section S and provided with an offset or projection which comes under and is adapted to lift the push-piece. The free end of the lever has a screw-threaded boss engaged by a pressure-screw $s^{13}$, which, passing loosely through the section S, screws into and through the boss with its inner end contiguous to the face of the way $r^8$. A stiff spring $s^{14}$, encircling the stem of the screw, is interposed between the lever $s^{12}$ and the shell or case of section S. By turning the screw in the proper direction the free end of the lever will be caused to travel upon it in a direction to lift the push-piece and consequently to lock the joints between the sections of the stem. At the same time this travel of the free end of the lever will have the effect of jamming the inner end of the screw against the face of the way with sufficient force to clamp the stem securely thereto. When the screw is turned in the opposite direction, the spring $s^{14}$ tends to move the lever $s^{12}$ from action against the push-piece.

The head-rest proper, Figs. 20, 21, and 28, consists of a pair of pads T, adjustably mounted upon a bracket $t$, fast to the upper stem-section $S^2$. One pad is held to its bracket-arm by a clamping-screw $t'$, which passes through a longitudinal slot $t^2$ in the arm. The other pad is held to the other bracket by means of a split ring $t^3$, to which the pad is fastened, this ring encircling and being adapted to rotate upon a hub $t^4$, carried by the bracket-arm. A clamp-screw $t^5$ serves to hold the split ring in its adjusted position. In this way I can regulate with ease the distance between the adjoining ends of the two pads, as well as the angle at which the pads are to stand relatively to one another.

Having described the best way now known to me of carrying my improvements into effect, I state, in conclusion, that I do not restrict myself to the particular mechanical details hereinbefore set forth and illustrated in the accompanying drawings, for manifestly the same in many respects can be widely varied without departure from the spirit of my invention; but

What I claim herein as new, and desire to secure by Letters Patent, is as follows:

1. The combination with the plunger-cylinder and plunger, the pump and the duct leading from the pump to the cylinder, of a pressure storage-chamber interposed between the pump and cylinder, and communicating with said duct, a movable head or diaphragm in said chamber, and a spring which presses said diaphragm in a direction opposite to that in which it is forced by the liquid on its way from the pump to the cylinder, substantially as and for the purposes hereinbefore set forth.

2. The combination with the base and the plunger-cylinder, of the pump and pipe connections between it and the cylinder, together with the controlling-valves therein, formed as one structure detachably connected to the plunger-cylinder and independently removable from the base, substantially as and for the purposes hereinbefore set forth.

3. The combination with the chair-supporting plunger, and elevating mechanism therefor, of an operating foot-lever for said mechanism adapted to be turned into or out of operative position at pleasure, automatic plunger-locking mechanism and connections between said locking mechanism and foot-lever whereby the locking mechanism is brought and held out of engagement with the plunger whenever and so long as the foot-lever is in operative position, substantially as and for the purposes hereinbefore set forth.

4. The combination of the chair-supporting plunger elevating mechanism therefor; automatic plunger-locking mechanism; a foot-lever for operating said elevating mechanism having a jointed outer or free end; and connections between the locking mechanism and the jointed outer end of the lever whereby the locking mechanism is brought and held out of engagement with the plunger whenever and so long as the said jointed lever end is in position for use, substantially as hereinbefore set forth.

5. The combination of the chair-supporting plunger, step-by-step elevating mechanism therefor; a jointed foot-lever for actuating said mechanism; automatic plunger-locking mechanism; connections between the jointed outer end of the foot-lever and said locking mechanism whereby the latter is held out of engagement with the plunger whenever and so long as the jointed outer end of the lever is extended in position for use; and spring-controlled retaining devices whereby the jointed outer end of the lever is held in either its folded or its extended position, substantially as and for the purposes hereinbefore set forth.

6. The combination of a chair-supporting plunger; sustaining and locking mechanism therefor; plunger-elevating mechanism; and an operating foot-lever for said mechanism adapted to be turned into or out of operative position at pleasure; connections between said foot-lever and locking mechanism, whereby the plunger is released from control of the locking mechanism whenever and so long as the foot-lever is in operative position; a lowering-lever independent of the said operating-lever for the plunger-elevating mechanism; and connections between said lowering-lever and the plunger sustaining and locking mechanism respectively, whereby the lever by one movement unlocks the plunger and trips its sustaining mechanism, substantially as and for the purposes set forth.

7. The combination of a chair-supporting plunger and elevating mechanism therefor; plunger-locking mechanism; a foot-lever for said elevating mechanism adapted to be turned into and out of operative position at pleasure; a lowering-lever; and connections between the plunger-locking mechanism and the elevating and lowering levers, whereby either one of said levers may operate the locking mechanism, independently of the other to effect the release of the plunger, substantially as hereinbefore set forth.

8. A telescopic chair-supporting plunger, elevating mechanism therefor, a separate locking mechanism for each member of the telescopic plunger, and connections whereby said locking mechanisms are operated simultaneously to lock or release their respective plunger members, substantially as and for the purposes hereinbefore set forth.

9. The combination with a plunger-cylinder, a liquid-reservoir and a force-pump by which the cylinder is supplied with liquid for lifting and sustaining the chair-supporting plunger therein, of a telescopic chair-supporting plunger, a stop for arresting the upward movement of the lower plunger member, a normally-closed relief or discharge valve, and connections between said valve and the upper plunger member whereby when the latter is raised to a predetermined height, said relief-valve will open to permit any further liquid supplied by the pump to return to the reservoir, substantially as and for the purposes hereinbefore set forth.

10. The combination of a plunger-cylinder, a force-pump by which the cylinder is supplied with liquid for lifting and sustaining the chair-supporting plunger therein; a telescopic chair-supporting plunger; means for limiting the upward movement of each member of said plunger; individual locking mechanisms for each plunger member; and a lever and connections whereby the individual locking mechanisms of all the plunger members are actuated to release their respective members, by one and the same movement of the lever.

11. The combination of the plunger-cylinder, the telescopic plunger therein, mechanism for locking together the members of said plunger, a separate mechanism for locking the outer or lower member to the plunger-cylinder, a single operating-lever, and connections whereby said lever is caused to operate both sets of locking mechanisms to release the several plunger members from one another and from the plunger-cylinder, substantially as and for the purposes hereinbefore set forth.

12. In a chair, a pedestal, a plunger or chair-body support composed of a plurality of sections vertically extensible relatively to the pedestal and to each other, means for locking and unlocking said sections at any point within their vertical range of movement, and a single lever or operating device for controlling said locking and unlocking means, substantially as and for the purposes hereinbefore set forth.

13. In a chair, a pedestal, a plunger or chair-body support composed of a plurality of sections vertically extensible relatively to the pedestal and to each other, an elevating mechanism common to all of said plunger-sections, connections whereby said elevating mechanism is caused to lift each plunger-section, and means for locking each section in its vertically-adjusted position, substantially as hereinbefore set forth.

14. The combination with the base, the chair-body, and a plunger for supporting the chair-body, of a ball-and-socket joint connecting the chair-body and plunger consisting of a socket attached to the chair-body, and a hollow spherical or ball segment open at the bottom and attached by its head or top to the plunger, substantially as and for the purposes hereinbefore set forth.

15. In combination with the chair-body and the supporting-plunger therefor, a ball-and-socket joint connecting the two, of which the ball member is attached to the plunger and the socket member is attached to the chair-body, the socket member being divided horizontally, and in the axial plane of the ball, into two parts, the upper part being attached to the chair-body and the lower part formed as a split ring attached to the upper part, and provided with means for clamping it upon the ball, substantially as hereinbefore set forth.

16. The combination with the chair-body and its supporting-plunger of a connecting ball-and-socket joint, the two members of that joint being united by a groove-and-pin connection located and arranged substantially as described, to permit the chair-body to rock both laterally and forward and back, but to prevent its rotation horizontally or in the plane of the seat, substantially as and for the purposes hereinbefore set forth.

17. The combination with the chair-body and its supporting-plunger of a ball-and-socket joint connecting said parts, the two members of the joint having a groove-and-pin connection with each other permitting the chair to rock both laterally and forward and back, a clamp or lock for holding the members rigidly together, and a separate locking-dog for preventing lateral tilting of the chair, located in the line of the axis upon which the chair moves in rocking from front to rear, substantially as and for the purposes hereinbefore set forth.

18. The combination of the chair-body and its supporting-plunger; a ball-and-socket joint connecting said parts, the two members of the joint having a groove-and-pin connection with each other whereby they are restrained from rotation relatively to one another horizontally or in the plane of the seat; a clamp or lock for holding the members rigidly together; a locking-dog for locking the chair against lateral rocking movement only; and a single operating-lever and connections for operating both the clamp and the locking-dog, the connections between the locking-dog and the lever having sufficient slack to permit the lever by a partial movement to operate the clamp to free the members, and thus permit them to rock from front to rear, without disturbing the locking-dog, substantially as hereinbefore set forth.

19. The combination with the chair-body of the foot-board-carrying frame hinged to the chair-body, the foot-board hinged to the carrying-frame, and rods having their upper ends detachably jointed to the chair-body and their lower ends jointed to the foot-board at points eccentric to the hinge between the foot-board and its carrying-frame, by half-round bearings carried by said rods resting upon journals or joint-pins attached to and projecting inwardly from the interior opposite sides of the foot-board, whereby said foot-board can at will be connected to and disconnected from said rods, substantially as and for the purposes hereinbefore set forth.

20. The combination with the chair-body, the vertically-movable supporting-plunger therefor, and the plunger-cylinder, of a ball-and-socket joint comprising a ball to which the plunger is secured at a point laterally to one side of the vertical axis of said ball, and a socket fitting the ball, and secured centrally to the under side of the chair, substantially as and for the purposes hereinbefore set forth.

21. The combination of the chair-body; the foot-board-carrying frame hinged to the chair-body; the foot-board, hinged to the carrying-frame; controlling-rods having their upper ends jointed to the chair-body and their lower ends detachably jointed to the foot-board at points eccentric to the hinge between the foot-board and its carrying-frame; the balancing-spring $k^5$ connected to the said rods; and stops $k^{14}$ $k^{15}$ attached to the said rods and the foot-board-carrying frame respectively, substantially as and for the purposes hereinbefore set forth.

22. In combination with the foot-board, the auxiliary step-supporting frame hinged thereto and arranged and adapted, substantially as described to fold up under the foot-board, when during the descent of the foot-board, it is pressed upon or against the floor on which the chair stands, and to automatically unfold and resume its position of use when relieved of that pressure, substantially as and for the purposes hereinbefore set forth.

23. In a dental chair and in combination with the seat-frame an arm-rest, and a support therefor hinged to the forward end of the seat-frame upon a transverse horizontal axis, so that said arm-rest may be swung forward entirely clear of the seat leaving the side of the seat-frame without impediment to the operator, and a locking device upon the seat-frame, above the hinge-point of the arm-rest support, and adapted to engage said support at a point between the hinge and the arm-cushion or arm-rest proper, substantially as set forth.

24. In combination with the seat-frame and arm-rest support hinged thereto at or near the front end of said frame upon a transverse horizontal axis, a bearing on the seat-frame against which the said support brings up and upon which it rests when raised into its position of use, and a locking device on the seat-frame which engages the said support at a point between the hinge and the arm-cushion or arm-rest proper, substantially as and for the purposes hereinbefore set forth.

25. The combination with the seat-frame and the arm-rest and its support, of a hinge between the two consisting of a horizontal laterally-projecting stud on the one and a corresponding socket in the other to receive the stud, a cross-pin in the socket engaging a peripheral groove in the stud, the latter being also cut away on one side at its inner end beyond the groove, and the arrangement being such that the cut-away portion of the stud will be opposite the cross-pin when the arm-rest is swung forward and down upon its hinge, substantially as and for the purposes hereinbefore set forth.

26. In combination, a seat-frame, an arc-shaped hinge member secured thereto and located below the top of the seat, a back-supporting frame provided at its lower end with a concentric hinge member fitting the hinge member on the seat-frame, a back carried by and vertically adjustable on the back-supporting frame, and means for locking said back-supporting frame, in its adjusted position.

27. In combination, a seat-frame and an arc-shaped hinge member secured thereto concave face uppermost and located below the top of the seat, a back-supporting frame having at its lower end a concentric hinge member fitting the hinge member on the seat-frame, a back carried by and vertically adjustable upon said frame, and means for locking said frame in its adjusted position.

28. The back-supporting frame, having a guideway for the reception of a vertically-adjustable chair-back, and prolonged below the guideway in a portion curved and formed to constitute one member of a concentric hinge, in combination with the chair-seat frame, the stationary concentric hinge member secured thereto, and means for locking together the two members, substantially as hereinbefore set forth.

29. In combination with the chair-seat frame and the back-supporting frame a concentric hinge connecting the same consisting of an arc-shaped stationary member attached to the seat-frame, a concentrically-curved movable member carried by the chair-back frame and fitting and engaging the stationary member, a spring-actuated locking device for automatically locking the two members in adjusted position, a releasing handle or knob mounted on the upper part of the back-supporting frame above the hinge, and connections between the locking device and the handle whereby said device can be moved in a direction to unlock the hinge member, substantially as hereinbefore set forth.

30. The stationary curved hinged member having a trough-like form and secured bottom uppermost to the chair-seat frame, in combination with the back-supporting frame, provided with a concentrically-curved hinged member fitting between the sides of the stationary member, the two members being united by a tongue-and-grooved connection, in combination with a locking-dog carried by the movable hinged member and adapted to engage a rack on the inner face of the stationary member, substantially as described.

31. In combination with the back-supporting frame and the seat-frame, the two concentrically-curved hinged members engaging and fitting and adapted to slide one upon the other, and a spring-pressed pad carried by the one and adapted to exert constant pressure upon the other, substantially as and for the purposes hereinbefore set forth.

32. The combination with a back-supporting frame of a back-pad carrier mounted and vertically adjustable on said frame, a back-pad hinged at its top to the back-pad carrier, and provided upon its face next the carrier with a rack projecting toward the latter; and a pivoted dog or detent mounted on the carrier in position to engage the rack, and provided with a finger adapted to engage a stop on the rack to limit the movement of the back-pad away from the carrier, substantially as and for the purpose hereinbefore set forth.

33. A head-rest-supporting stem composed of sections united by a plurality of ball-and-socket joints, in combination with a handle located upon one of the end sections, beyond the series of joints, and means controlled thereby for locking all of said joints simultaneously and by one movement of the handle, substantially as and for the purposes hereinbefore set forth.

34. The combination with a chair-back of a head-rest-supporting stem, mounted and vertically adjustable as a whole thereon, and composed of sections, united by a plurality of ball-and-socket joints, a lock for rigidly fastening the stem in its position of vertical adjustment on the back, means for locking all of said joints simultaneously, and a handle mounted upon the end section which carries the lock and connected to and adapted to operate at one and the same time and by one movement, the lock for the stem and the means for simultaneously locking all of the ball-and-socket joints in said stem, substantially as and for the purposes hereinbefore set forth.

35. The combination with the head-rest and the head-rest-supporting stem composed of a plurality of sections jointed together, of joint locking or clamping devices, the toggle-lever and connections whereby said toggle-lever is caused to operate the clamping devices to lock or release all the joints simultaneously, substantially as and for the purposes hereinbefore set forth.

36. In a head-rest stem composed of a plurality of sections united by ball-and-socket joints, a section provided with a pressure-transmitting spindle or rod extending lengthwise of and through said section as well as through the ball member of the joint carried by said section, and longitudinally movable therein to transmit locking or clamping pressure from one end of the section to a point beyond its opposite end, substantially as and for the purpose hereinbefore set forth.

37. In a head-rest stem composed of a plurality of sections jointed together end to end, a section provided with a longitudinally-movable pressure-transmitting rod extending lengthwise of and through the section including the male member of the joint carried by said section, and means located at a point beyond said section for exerting endwise pressure upon said pressure-transmitting rod, substantially as and for the purposes hereinbefore set forth.

38. The head-rest stem composed of sections united together by ball-and-socket joints, in combination with a toggle-lever in the bottom section, means for pressing said lever, a clamp for the ball of each ball-and-socket joint, and pressers and motion-transmitting spindles carried by and movable relatively to stem-sections, and acted on by the toggle-lever to effect the simultaneous clamping of all the ball-and-socket joints.

39. The combination of the head-rest stem-sections the ball-and-socket joints uniting the same, the pusher in the lowermost section arranged to act upon and clamp the ball which adjoins it in its socket, the pusher or presser at the upper end of the middle section arranged to have a corresponding clamping action upon the ball which it adjoins, a pressure-transmitting spindle carried by and extending longitudinally of the middle section and having its ends in contact with the upper and lower clamping pushers or pressers respectively, and means for thrusting or forcing the lowermost pusher in a direction to exert clamping action—the combination being and acting substantially as and for the purposes hereinbefore set forth.

40. The back-pad carrier provided with a head-rest way having a forward inclination from bottom to top relatively to the body of the carrier, in combination with a head-rest-supporting stem mounted and vertically movable upon said way, and a back-pad hinged to said carrier at a point in rear of the upper portion of the head-rest way, substantially as and for the purpose hereinbefore set forth.

In testimony whereof I have hereunto set my hand this 5th day of January, 1895.

BASIL M. WILKERSON.

Witnesses:
F. B. KEEFER,
L. C. HILLS.